United States Patent
Latham, II et al.

(10) Patent No.: US 8,164,320 B2
(45) Date of Patent: Apr. 24, 2012

(54) METHODS AND SYSTEMS FOR CONTROL OF SWITCHES IN POWER REGULATORS/POWER AMPLIFIERS

(75) Inventors: Paul W. Latham, II, Lee, NH (US); Stewart Kenly, Lee, NH (US); Laszlo Balogh, S. Portland, ME (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 13/012,453

(22) Filed: Jan. 24, 2011

(65) Prior Publication Data
US 2011/0175582 A1 Jul. 21, 2011

Related U.S. Application Data

(63) Continuation of application No. 11/962,571, filed on Dec. 21, 2007, now Pat. No. 7,880,454.

(51) Int. Cl.
*G05F 1/00* (2006.01)
(52) U.S. Cl. ........................................ 323/284
(58) Field of Classification Search ............... 323/282, 323/283, 284, 288, 223, 351; 363/127, 56.04
See application file for complete search history.

(56) References Cited

U.S. PATENT DOCUMENTS

| 5,295,158 | A | 3/1994 | Jordan |
| 5,568,044 | A | 10/1996 | Bittner |
| 5,570,326 | A | 10/1996 | Trystram |
| 5,703,838 | A | 12/1997 | Gorbics et al. |
| 6,169,668 | B1 | 1/2001 | Clayton |
| 6,396,250 | B1 | 5/2002 | Bridge |
| 6,614,208 | B2 * | 9/2003 | Narita ................ 323/283 |
| 6,861,826 | B2 | 3/2005 | Lynch |
| 6,979,987 | B2 | 12/2005 | Kernahan et al. |
| 7,683,594 | B2 | 3/2010 | Kim et al. |
| 2003/0090299 | A1 | 5/2003 | Dathe et al. |
| 2005/0052952 | A1 | 3/2005 | Panek |
| 2005/0127881 | A1 | 6/2005 | Sase et al. |

OTHER PUBLICATIONS

Analog Devices: Pulse Width Modulator. Product Information Sheet for AD9561.© Analog Devices, Inc. 1996.
International Search Report for PCTUS07/89066 dated Sep. 22, 2008.
Sherman, J.D. et al., Synchronous rectification: improving the efficiency of buck converter. EDN Access, Mar. 14, 1996. Copyright© 1996 EDN Magazine.

* cited by examiner

*Primary Examiner* — Harry Behm
*Assistant Examiner* — Matthew Grubb

(57) ABSTRACT

A system includes a first switch connected to a voltage input and a switching node. A second switch is connected to the switching node and a reference potential. A first circuit generates first rising edges and first falling edges by comparing a voltage at the switching node to a first voltage reference. The first voltage reference is between the reference potential and the voltage input. A second circuit generates second rising edges and second falling edges by comparing the switching node voltage to a second voltage reference. The second voltage reference is less than the reference potential. The controller calculates delay times based on the first rising edges, the first falling edges, the second rising edges and the second falling edges. The controller generates drive signals for the first switch and the second switch based on a duty cycle and the delay times.

23 Claims, 15 Drawing Sheets

Decoded delay line value becomes lower bits of time stamp to add resolution.

METHODS AND SYSTEMS FOR CONTROL OF SWITCHES IN POWER REGULATORS/POWER AMPLIFIERS

CROSS-REFERENCE TO RELATED APPLICATIONS

This application is a continuation of U.S. patent application Ser. No. 11/962,571, filed on Dec. 21, 2007. The entire disclosure of the above application is incorporated herein by reference.

BACKGROUND

These teachings relate to the control of switches used in power regulators and power amplifiers. A typical example, a variety of other examples being also available, is a buck regulator shown in FIG. 1. In this example, the two switches 26 and 28 control the switch node, 14. When the mosfet switch 26 is closed the switch node is connected to the supply. When the mosfet switch 28 is closed, the switch node is connected to ground. Mosfets 26 and 28 are known as the source side (or HS) switch and synchronous rectifier switch (or LS) respectively. If both mosfets are closed, this results in a very undesirable condition and possibly results in catastrophic failure. If both mosfet switches are open, the switch node is free to move as dictated by the inductor current until the body-diode in the mosfets starts to conduct. This mode of operation is also undesirable because the voltage drop across the body-diode results in lower efficiency and higher power dissipation. It is desired to have a control strategy that manages the timing of mosfets 26 and 28 such that they are neither on at the same time (cross conduction or shoot-through) or off at the same time for any significant period (dead-time).

A number of conventional control strategies have been proposed and implemented but the conventional control strategies do not have both high speed and insensitivity to high frequency ringing.

BRIEF SUMMARY

In one embodiment, the method of these teachings for controlling timing of switches in power regulator/power amplifiers includes monitoring a switch node voltage, obtaining rising and falling edges of signals obtained from monitoring and utilizing the rising and falling edges of the signals obtained from monitoring, rising and falling edges of control circuit system switch drive signals and predetermined data to obtain delay time for actual drive signals.

Various detailed embodiments of the method of these teachings are disclosed.

Embodiments of the system of these teachings are also disclosed.

For a better understanding of the present invention, together with other and further needs thereof, reference is made to the accompanying drawings and detailed description and its scope will be pointed out in the appended claims.

DETAILED DESCRIPTION

In one embodiment, the method of these teachings for controlling timing of switches in power regulator/power amplifiers includes monitoring a switch node voltage, obtaining rising and falling edges of signals obtained from monitoring and utilizing the rising and falling edges of the signals obtained from monitoring, rising and falling edges of control circuit system switch drive signals and predetermined data to obtain delay time for actual drive signals. The actual drive signals provide the control strategy for turning on and off the high side (source) and low side (synchronous rectifier) switches.

In one instance, (in the step of utilizing of the rising or falling edges of the signals) time differences are obtained by monitoring rising and falling edges of control circuit systems switch drive signals and predetermined data, the result of which generates two or more groups of time differences. A first group of time differences is provided to a programmable time delay. The programmable time delay controls a circuit system high side switch drive signal. A second group of time differences is provided to another programmable time delay to control a circuit system low side switch drive signal. The delayed control circuit and system drive signals are the actual drive signals.

The embodiment of the method of these teachings described hereinabove enables rendering the delay between the control circuit system switch drive signal and the drive signal to the switch (high side or low side) input a predetermined value.

Figure 1:
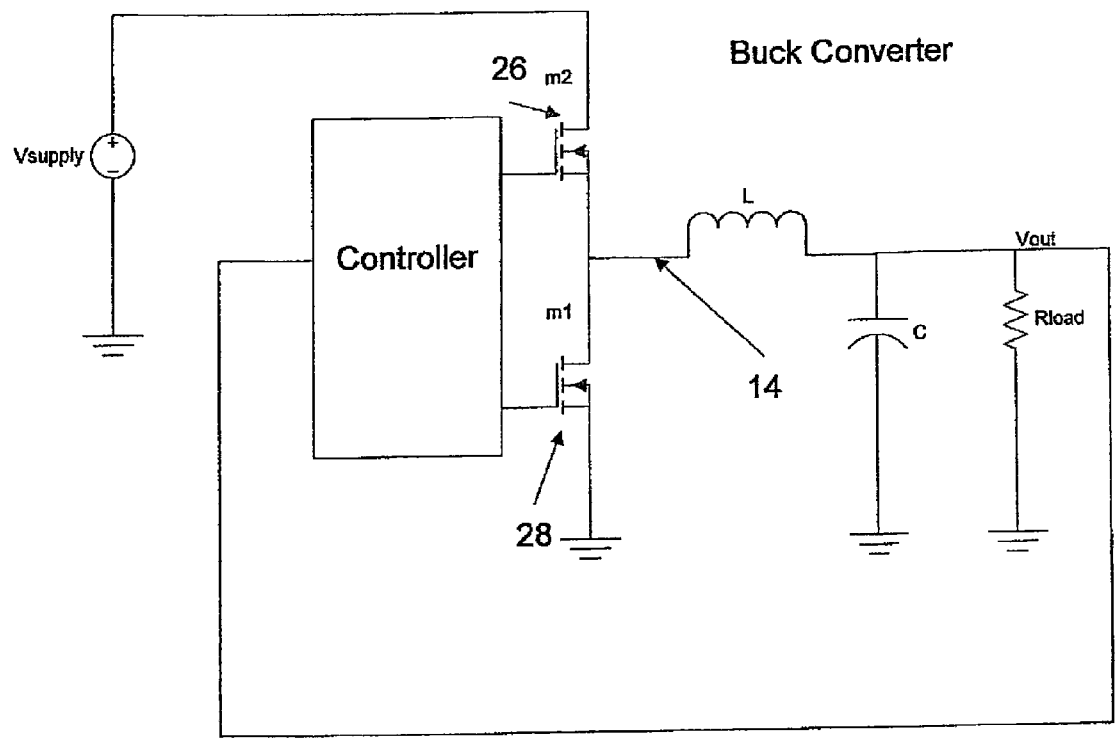
FIG. 1 is a conventional buck regulator system.
Figure 2:
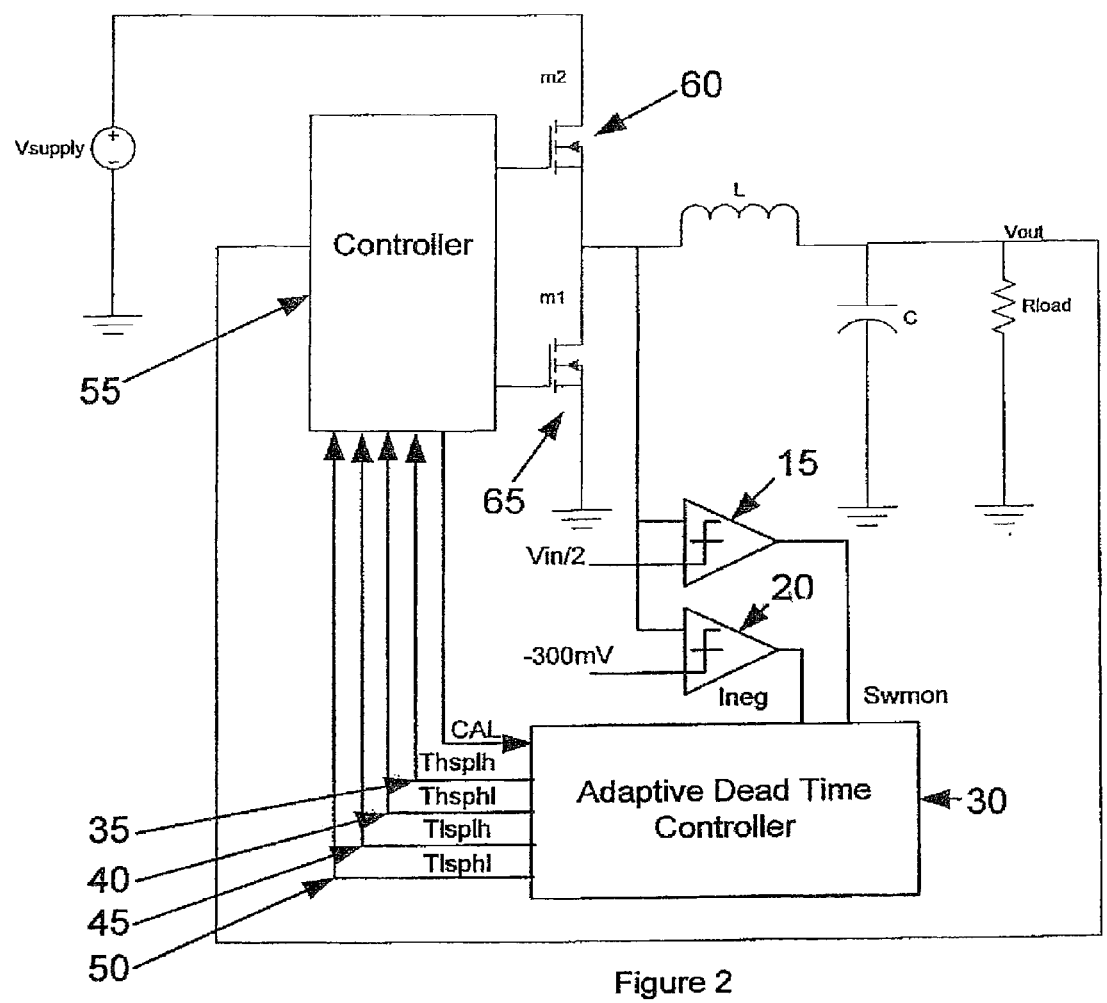
FIG. 2 is a graphical schematic representation of an embodiment of the system of these teachings.

One embodiment of the system of these teachings is shown in FIG. 2. Although the embodiment shown in FIG. 2 is applied to a buck regulator, it should be noted that this application is not a limitation of these teachings and the system of these teachings can be applied to other power regulators or power amplifiers. Referring to FIG. 2, two signals are derived from comparators 15, 20; one signal, labeled "swmon," is obtained from a comparator 15 having as inputs the switch node voltage and a predetermined threshold (50% of Vsupply in the embodiment shown); another signal, labeled "ineg," is obtained from another comparator 20 having as inputs the switch node voltage and another predetermined threshold (a negative threshold, −300 mV, in the embodiment shown). (If the signal monitoring is performed when there is no load on the power regulator, one comparator can be sufficient. These teachings also include embodiments with only one comparator.) It should be noted that although the embodiment shown in FIG. 2 utilizes one or more comparators, embodiments utilizing other instances of one or more pulse generating component (other than comparators) for generating a first rising edge and a first falling edge indicative of source switch (high side) output and for generating a second rising edge and a second falling edge indicative of synchronous rectifier (low side) switch body diode conduction, are within the scope of these teachings.

The rising and falling edges of the "swmon" signal, the rising and falling edges of the "ineg" signal, a control system high side (HS, also referred to as source) switch drive signal rising edge, a control system high side (HS, also referred to as source) switch drive signal falling edge, a control system low side (LS, also referred to as synchronous rectifier) switch drive signal rising edge, a control system low side (LS) switch drive signal falling edge and a signal indicative of a predetermined time are utilized by a time measurement component in the adaptive dead time controller 30 to provide a number of time measurements 35, 40, 45, 50 to a controller 55. The controller 55 provides the actual drive signals to the source switch (high side) 60 and to the synchronous rectifier switch (low side) 65.

Figure 3A:
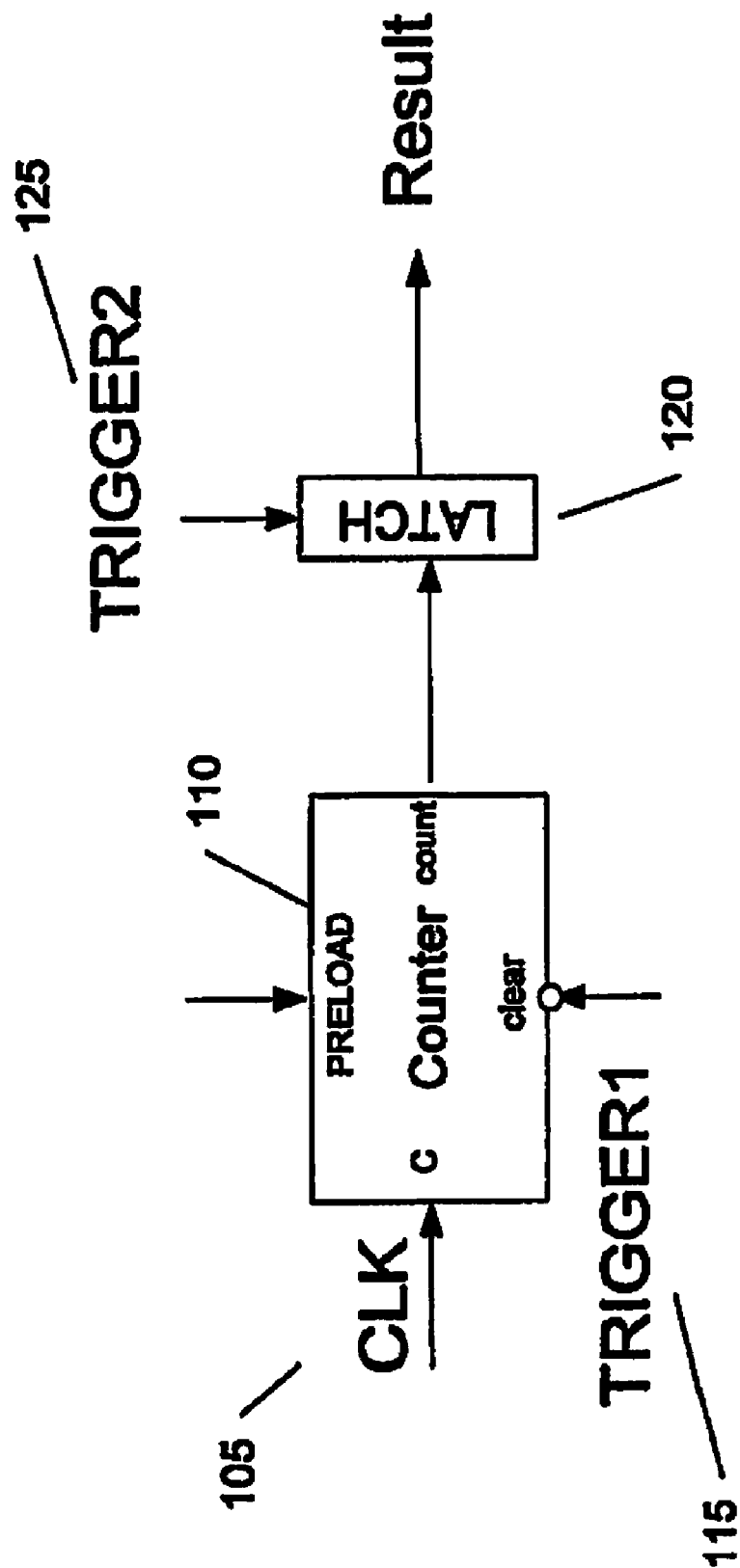
FIGS. 3a, 3b and 3d are graphical schematic representations of exemplary embodiments of a time measurement circuit utilized in one embodiment of the system of these teachings.
Figure 3B:
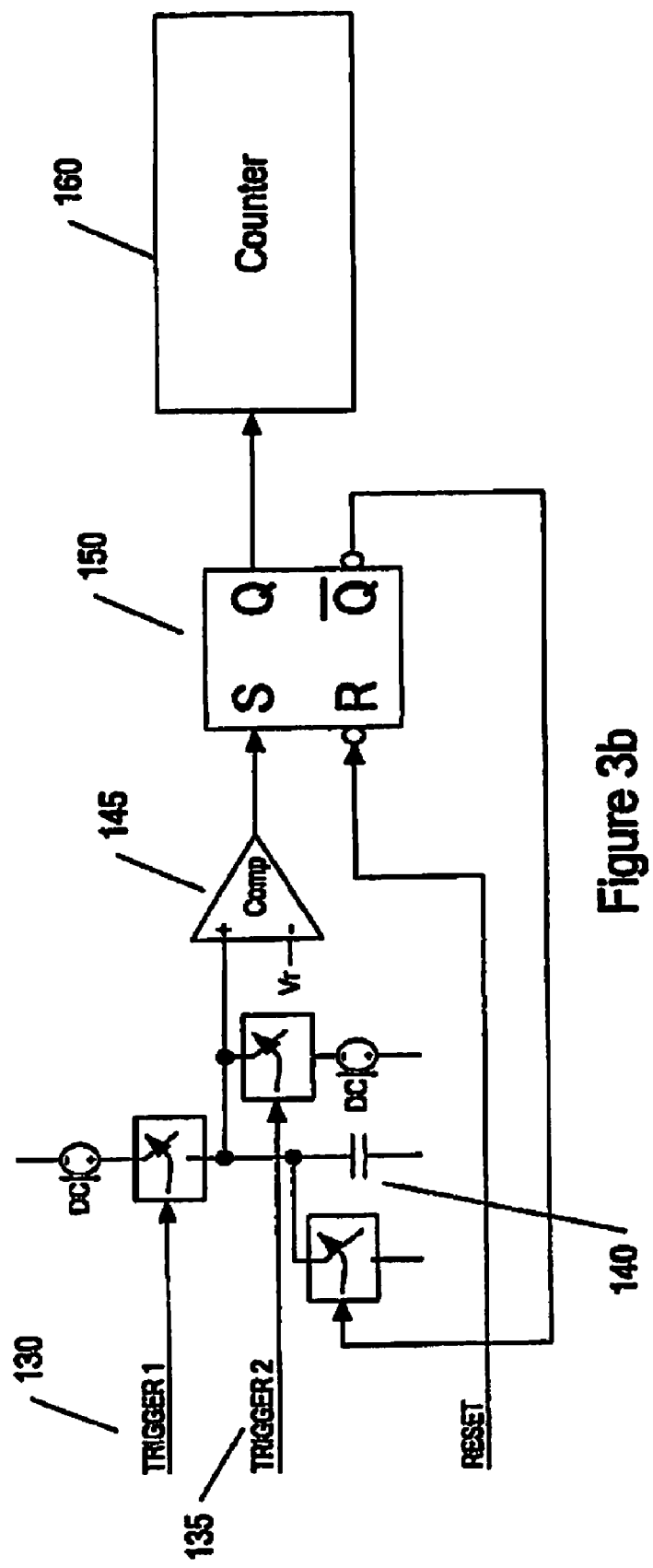
Figure 3C:
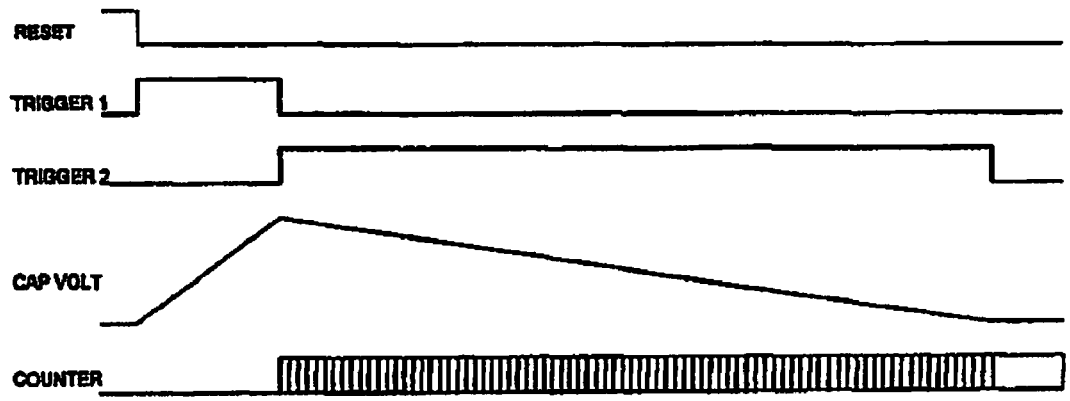
FIG. 3c is a graphical representation of timing diagrams for FIG. 3b.
Figure 3D:
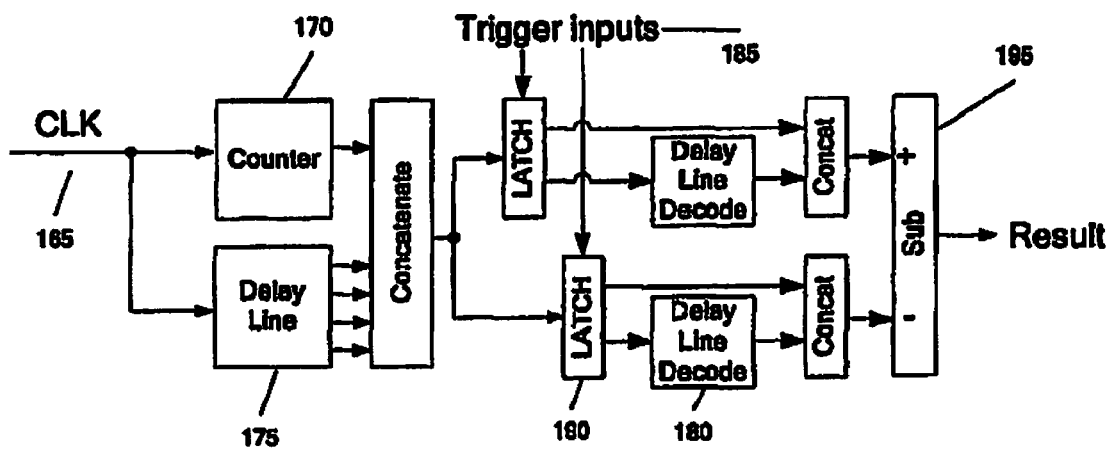

Embodiments of time measurements circuits are shown in FIGS. 3a, 3b, 3d. Referring to FIG. 3a, the circuit shown therein comprises a counter 110 receiving a trigger signal 115 (and a clock 107; in one instance, the counter counts clock pulses) and a latch 120 receiving another trigger signal 125. A time measurement circuit utilizing analog components is shown in FIG. 3b. Referring to FIG. 3b, a trigger signal 130 initiates the charging of a capacitor 140. Another trigger signal 135 initiates the discharging of a capacitor 140. The capacitor voltage is compared to a reference voltage by means of a comparator 145. The rising and falling edges from the output of the comparator are provided to a flip-flop 150 and the output of the flip-flop is provided to a counter 160. The timing of the signals for the circuit shown in FIG. 3b is shown in FIG. 3c. A counter/delay circuit for time measurement is shown in FIG. 3d. Referring to FIG. 3d, the output of a counter 170 and the output of a delay line 175, (both the counter 170 and the delay line 175 receive a clock signal 165 as input) are concatenated in order to obtain increased time resolution (allowing obtaining resolution higher than the clock frequency). The concatenated outputs are provided in parallel to two latches 185, 190. A decoder 180 transforms the latched delay line 175 values into the same form as the output of the counter 170. The time measurements with delay line decodes from the latches 185, 190 are subtracted in order to obtain a time interval measurement. (It should be noted that these teachings are not limited to only the embodiments of time measuring circuits shown in FIGS. 3a, 3b and 3d.)

Figure 4:
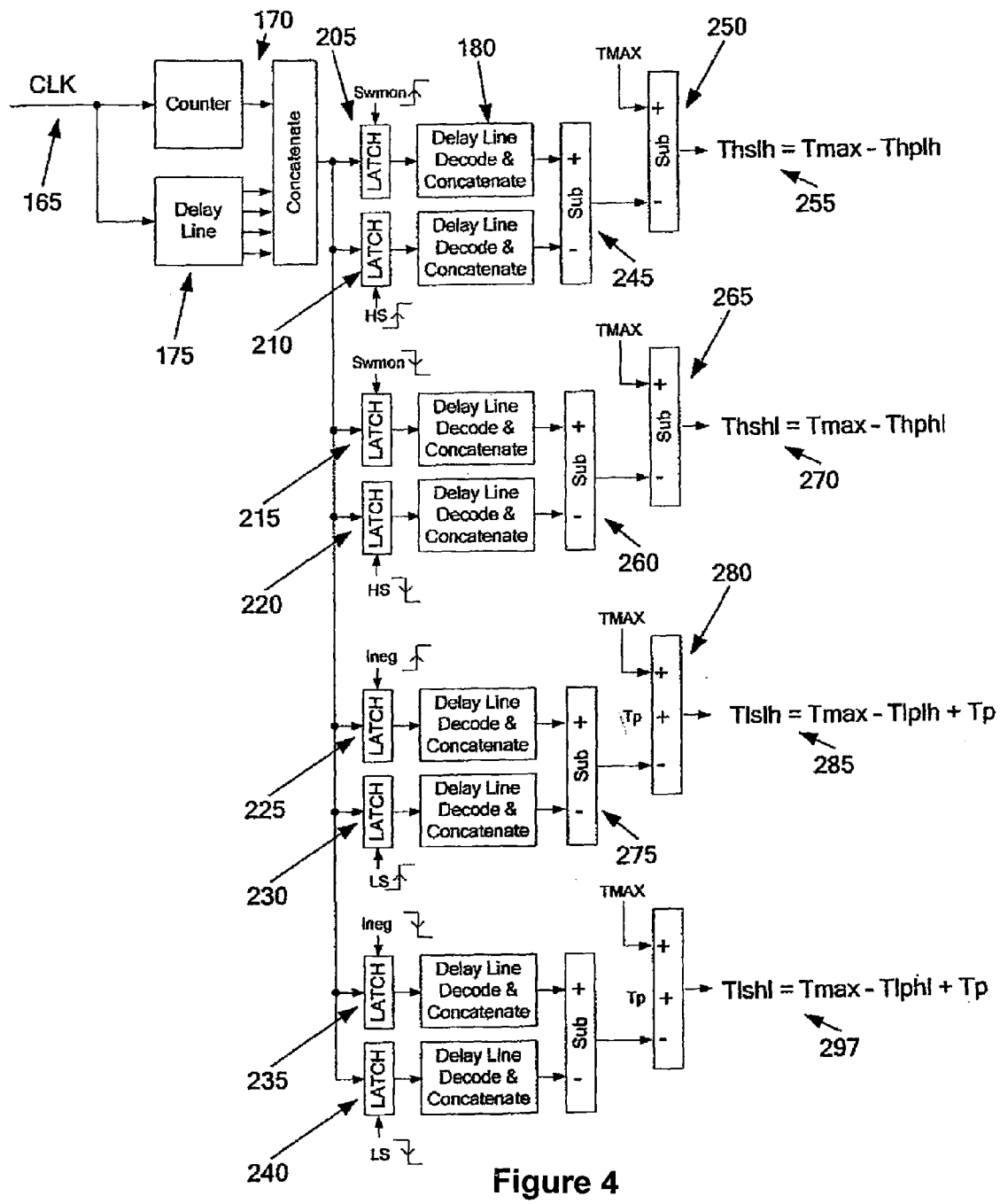
FIG. 4 is a graphical schematic representation of an embodiment of a component of one embodiment the system of these teachings.

One embodiment of the time measurement component in the adaptive dead time controller 30 is shown in FIG. 4. It should be noted that the embodiment shown in FIG. 4 is one of many possible embodiments. Embodiments with other implementations of the time measuring circuit are also within the scope of these teachings. Referring to FIG. 4, a counter/delay line circuit, such as the front end of FIG. 3d, provides a concatenated input to a bank of latches 205, 210, 215, 220 to 25, 230 235, 240. One latch from the first group of two latches 205, 210 receives as input the rising edge of the signal indicative of source switch (high side) output, "swmon" and the rising edge of the control system high side (HS, also referred to as source) switch drive signal. The difference between the outputs of the two latches in the first group of two latches 205, 210 is obtained by a subtraction component 245. The difference between the output of the two latches 205, 210 is subtracted from a predetermined quantity (labeled as Tmax, but other predetermined quantities, such as Tmax+Tho, are also within the scope of this teachings) by another subtraction component 250 in order to obtain the first output 255.

One latch from the second group of two latches 215, 220 receives as input the falling edge of the signal indicative of source switch (high side) output, "swmon" and the falling edge of the control system high side (HS, also referred to as source) switch drive signal. The difference between the output of the two latches in the second group of two latches 215, 220 is obtained by a subtraction component 260. The difference between the output of the two latches 215, 220 is subtracted from a predetermined quantity (labeled as Tmax, but other predetermined quantities, such as Tmax+Tho, are also within the scope of this teachings) by another subtraction component 265 in order to obtain the second output 270.

One latch from the third group of two latches 225, 230 receives as input the rising edge of the signal indicative of synchronous rectifier (low side) switch body diode conduction, "ineg," and the rising edge of the control system low side (LS, also referred to as synchronous rectifier) switch drive signal. The difference between the output of the two latches in the third group of two latches 225, 230 is obtained by a subtraction component 275. The difference between the output of the two latches 225, 230 is subtracted from a predetermined quantity (labeled as Tmax, but other predetermined quantities, such as Tmax+Tlo, are also within the scope of this teachings) by another subtraction component 280 in order to obtain the third output 285.

Finally, one latch from the fourth group of two latches 235, 240 receives as input the falling edge of the signal indicative of synchronous rectifier (low side) switch body diode conduction, "ineg," and the falling edge of the control system low side (LS, also referred to as synchronous rectifier) switch drive signal. The difference between the output of the two latches in the fourth group of two latches 235, 240 is obtained by a subtraction component 290. The difference between the output of the two latches 235, 240 is subtracted from a predetermined quantity (labeled as Tmax, but other predetermined quantities, such as Tmax+Tlo, are also within the scope of this teachings) by another subtraction component 295 in order to obtain the fourth output 297.

Figure 5A:
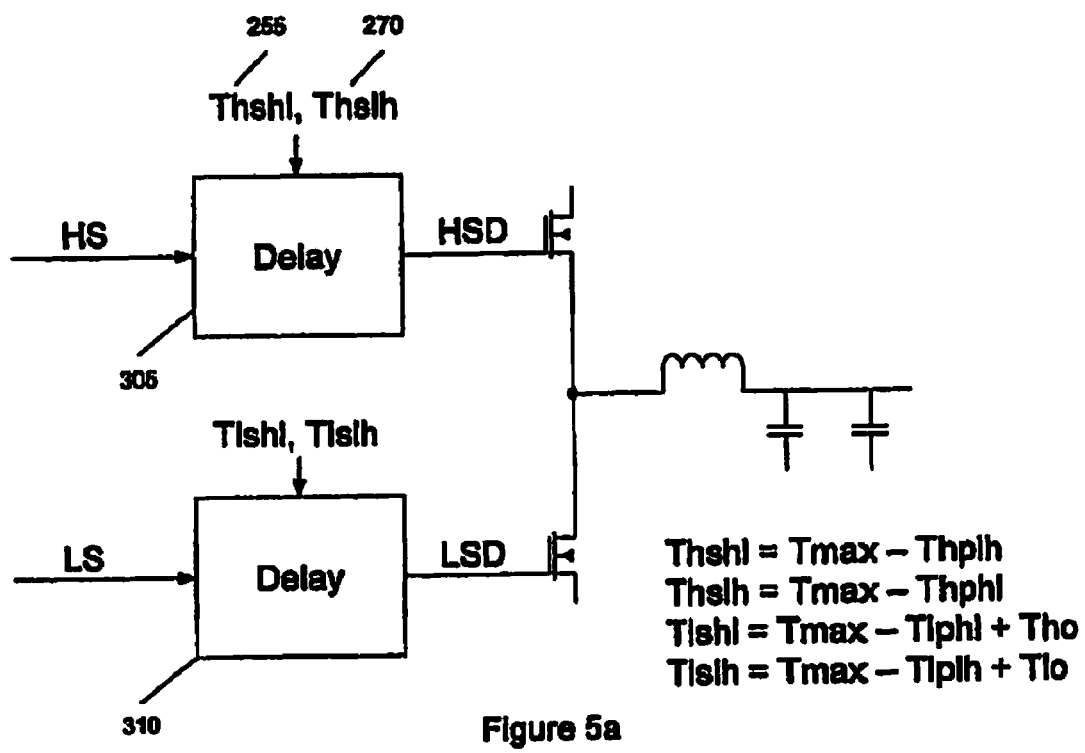
FIG. 5a is another graphical schematic representation of an embodiment of a component of one embodiment of the system of these teachings.

The outputs of the time measurement component in the adaptive dead time controller 30 are provided to a pair of adjustable time delays in the controller 55. One embodiment of the section of the controller 55 comprising the adjustable time delays is shown in FIG. 5a. Referring to FIG. 5a, one adjustable time delay 305 from the pair of adjustable time delays 305, 310 receives a first group of time measurements to 255, 270 and a control system (PWM controller) high side switch drive signal (HS) and provides a delayed control system high side switch drive signal (HSD). Another adjustable time delay 310 from the pair of adjustable time delays 305, 310 receives a second group of time measurements 25, 297 and a control system (PWM controller) low side switch drive signal (LS) and provides a delayed control system low side switch drive signal (LSD). The delayed control system high side switch drive signal (HSD) and the delayed control system low side switch drive signal (LSD) are the actual drive signals for the high side (source) switch and the low side (synchronous rectifier) switch.

Figure 6A:
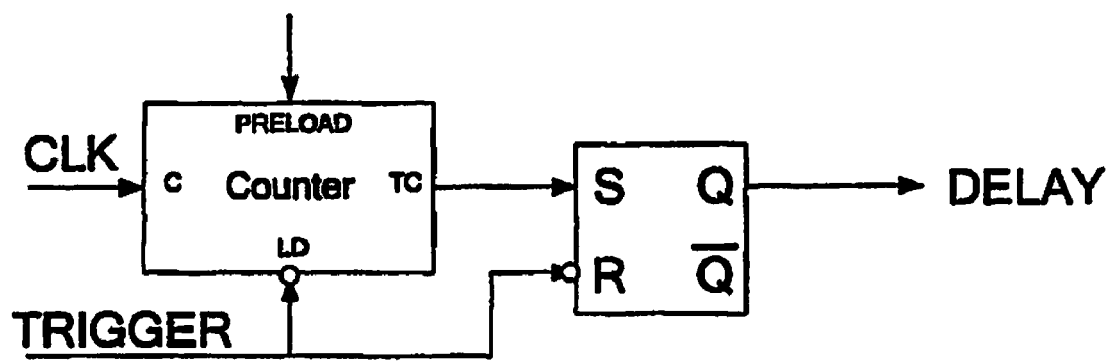
FIGS. 6a-6c are graphical schematic representations of exemplary embodiments of a variable time delay circuit utilized in one embodiment of the system of these teachings.
Figure 6B:
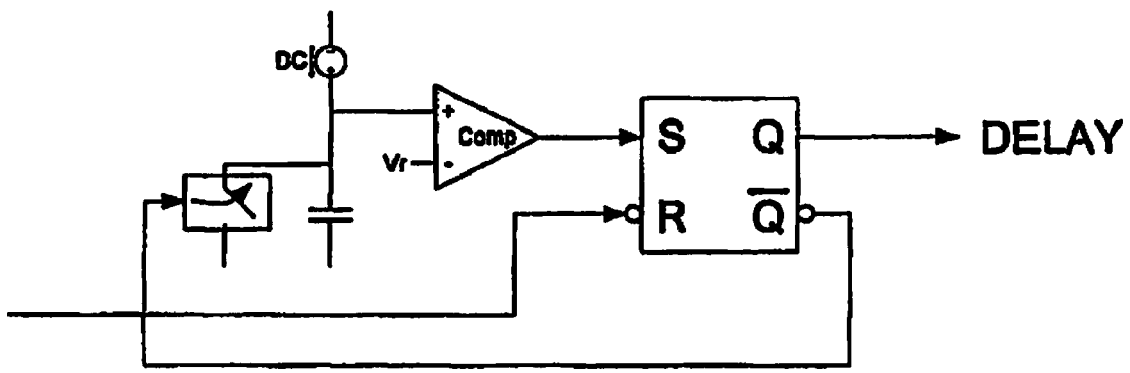
Figure 6C:
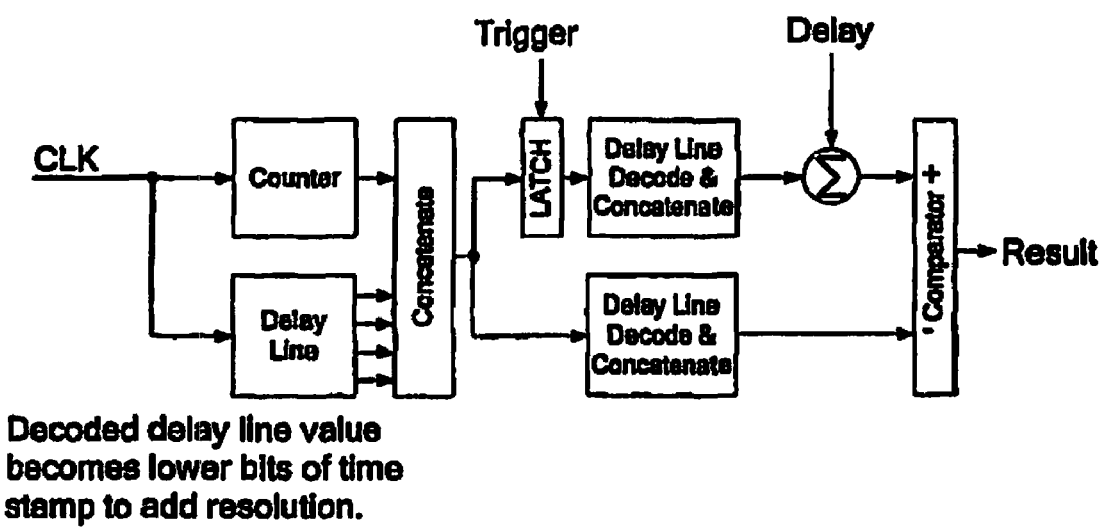

FIGS. 6a-6c present several exemplary embodiments of an adjustable time delay element. It should be noted that these teachings are not limited only to those exemplary embodiments.

During operation of the embodiment of these teachings shown in FIG. 2, the switch node voltage is monitored (the inductor current is not monitored). The quantity labeled "ineg" (the output of comparator 20 in FIG. 2) is only sampled when body-diode conduction is expected (in the synchronous rectifier switch) and, thus, a negative voltage on the SW node is expected. When below critical conduction, as noted by the lack of negative voltage on SW between the LS-HS positive transition in FIG. 7, there will be no "ineg" signal associated with the LS-HS-LS pulse. To ensure body diode conduction occurs and to minimize the impact on efficiency, a special calibration pulse (320, FIG. 7) is inserted in the LS signal at a periodic rate substantially less than the nominal PWM rate.

Figure 5B:
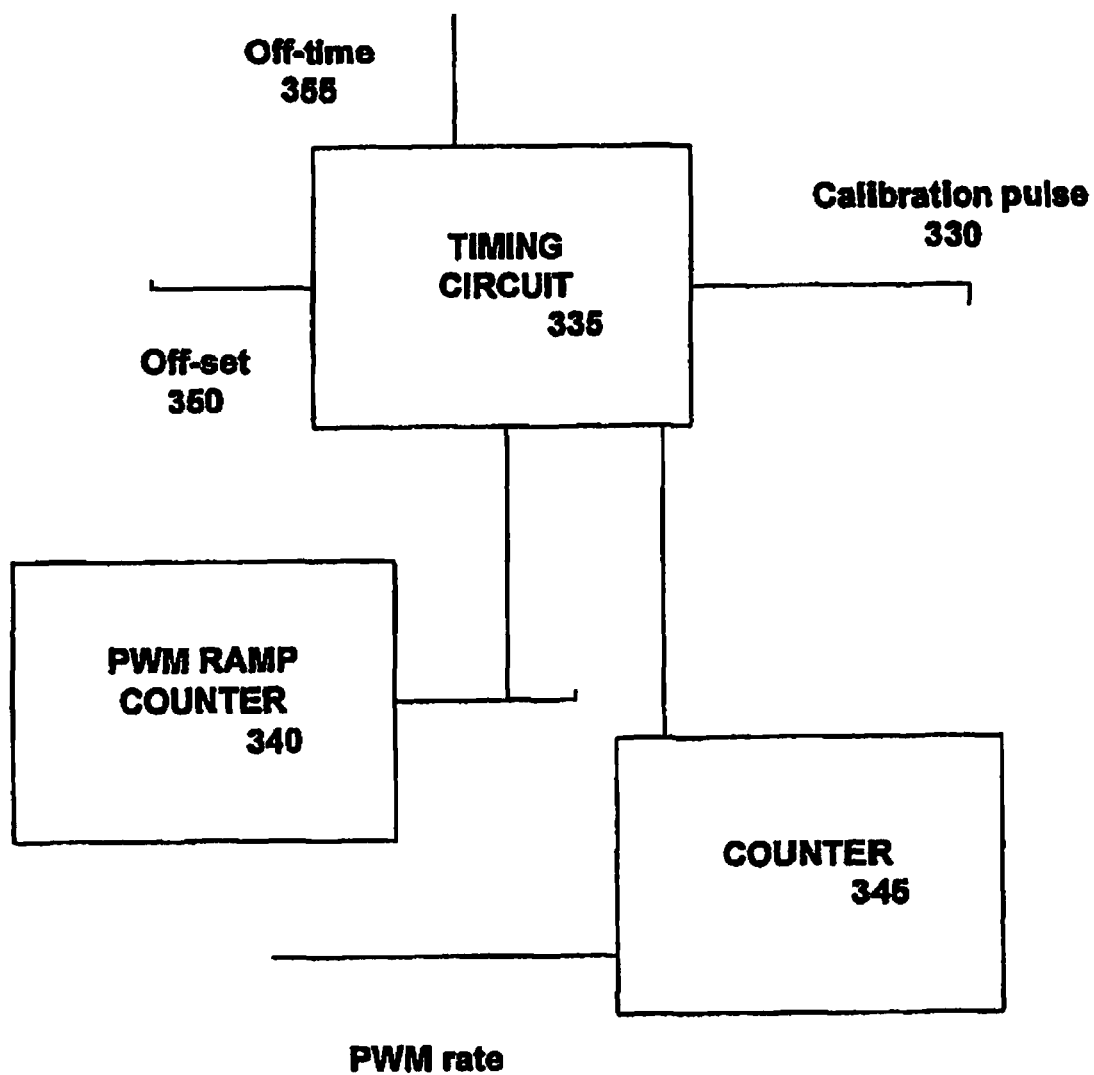
FIG. 5b is yet another graphical schematic representation of an embodiment of a sub-system of one embodiment of the system of these teachings.
Figure 7:
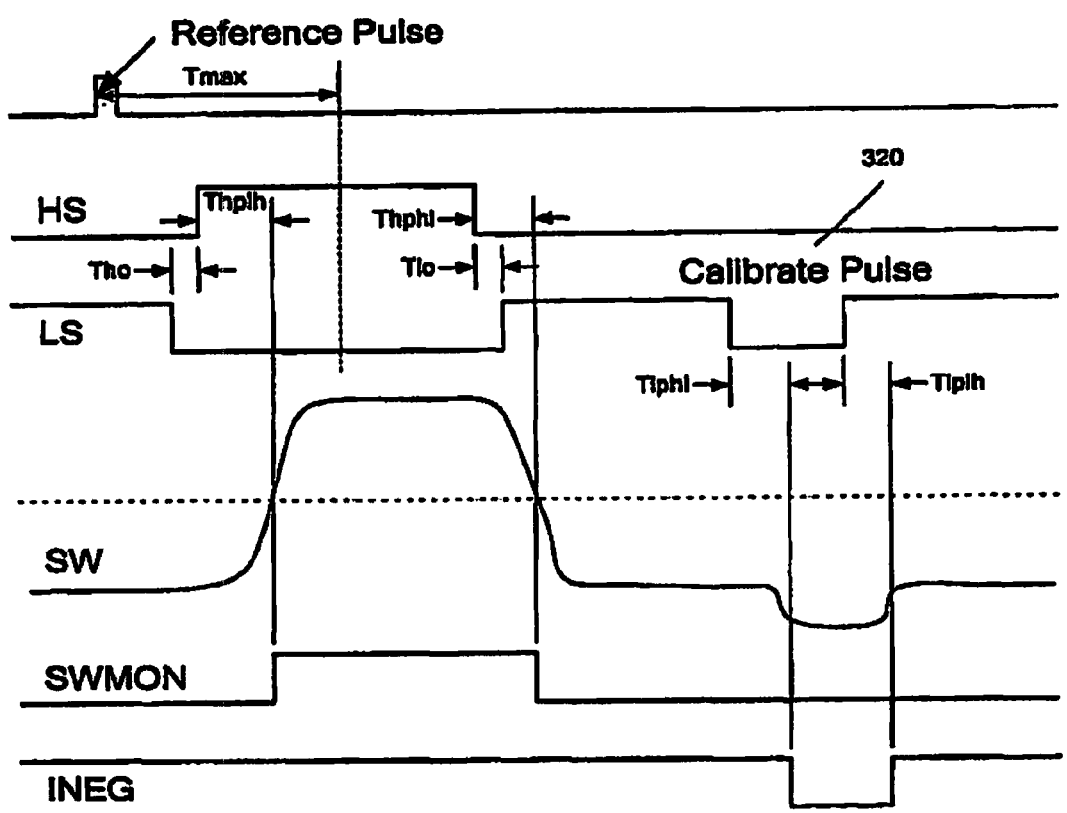
FIG. 7 is a graphical representation of the timing diagrams for operation of an embodiment of the system of these teachings.

In one embodiment, shown in FIG. 5b, a timing circuit 335 generates the calibration pulse (320, FIG. 7). The timing circuit 335 monitors a master PWM ramp counter and a reference pulse relating to the reset value of the ramp (a control system signal ramp counter) 340 and compares the output of the master PWM ramp counter against a predetermined offset 350 from the rising edge of the LS signal and another predetermined time 355. (In some conventional systems, the input to the circuits providing the control system switch drive signals is a PWM signal from PWM circuit. However, it should be noted that other techniques besides PWM are within the scope of these teachings.) A blanking (calibration) signal 330 is generated by the timing circuit 335 and is added to the LSD signal (see FIG. 5a) at a periodic rate determined by another separate counter 345, which is synchronous to the PWM rate (control system signal rate). The periodic rate is substantially less than the nominal PWM rate.

The rising and falling edges of HS, LS, swmon and ineg trigger latches that capture the PWM ramp counter which acts as a substantially absolute time base for the time calculations. In one instance, in the embodiment shown in FIG. 4, each latch circuit has a valid flag to tell the dead-time logic both samples are latched. If there is a missing timestamp, the logic ignores the values and holds its previous sample till the next PWM cycle. The ineg signal is qualified further to ensure the time from LS calibrate pulse to ineg is a positive time and less than a predetermined time (in one exemplary embodiment, the limitation of this teachings, 100 ns, an empirically determined number that is a substantially worst case over the operating range of the circuit).

Once the time stamps are captured and validated, the logic (as shown in FIG. 4) calculates the raw propagation delays from command to respective switch transition with the following equations:

$Thplh = swRise - hsRise$ $Tlphl = swFall - hsFall$ $Tlplh = inegRise - lsRise$ $Tlphl = inegFall - lsFall$ In the event a sample is not valid, the previous version of that value is used in the calculation to prevent erroneous results.

Once these values are available, the final Duty cycle values are calculated. (LS falling to HS rising) and negative (HS falling to LS rising) offsets are calculated and PWM is instructed (the calculated delays are utilized) to insert these values into its LS generation circuit. The final equations are as follows, where DutyIn is the desired (predetermined) time value from the center of the rising portion of the switch node voltage to the center of the switch node voltage pulse:

$HSdutyRise = DutyIn + Tmax - Thplh$ $HSdutyFall = DutyIn + Tmax - Thphl$ $LSdutyRise = DutyIn + Tmax - Tlplh + Tho$ $LSdutyFall = DutyIn + Tmax - Tlphl + Tlo$ The four duty cycle values are used by a dual-edge modulator to precisely place all four edges. (in the embodiment disclosed hereinabove, the adaptive dead time Controller 30 provides the PWM the desired timing utilize to generate the delays. In one embodiment, the timer utilized to generate a signal for measuring the LS-ineg delays is incorporated in the PWM. However this is not a limitation of these teachings; other embodiments are within the scope of these teachings. The signal generated by the timer is provided to the adaptive dead time controller 30.)

Tmax is a predetermined value. In one instance, Tmax is measured and corresponds to the substantially maximum propagation delay a user would want to compensate for. The measured delays Thplh, Thphl, Tlphl and Tlplh are subtracted from the pre-determined Tmax delay in order to, among other effects, normalize the switch delay variability.

Figure 8:
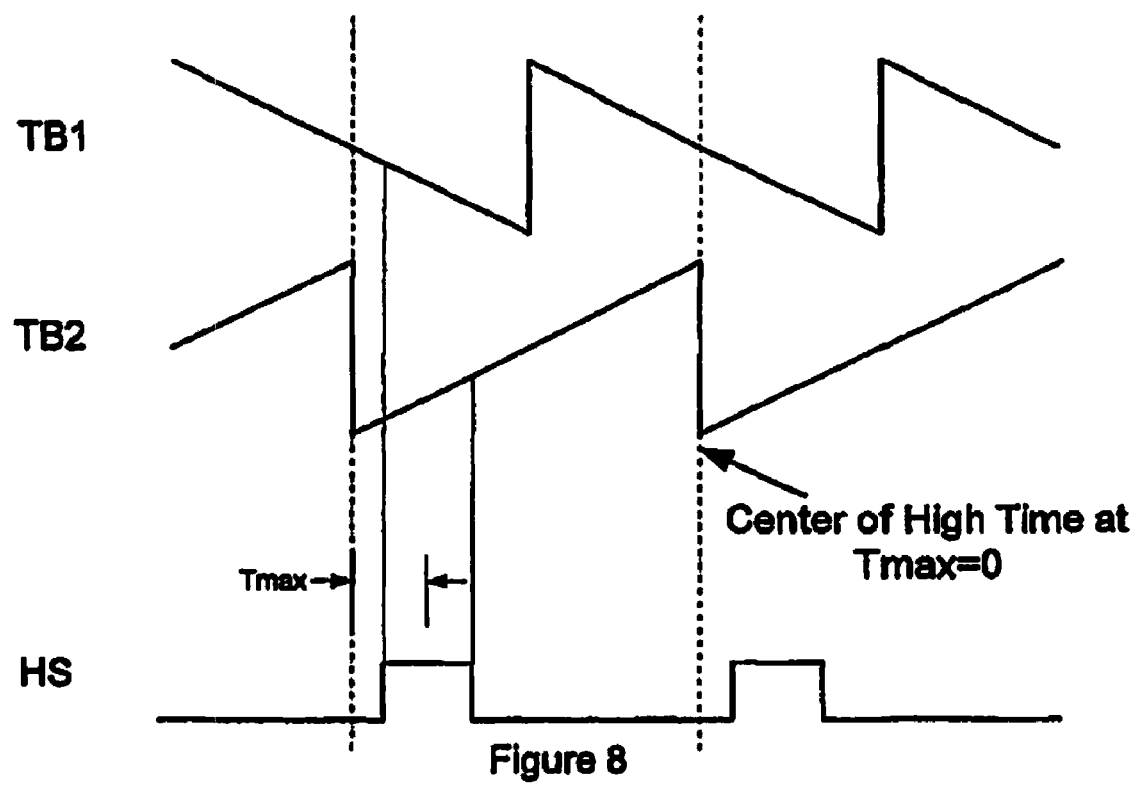
FIG. 8 is a graphical representation of timing diagrams for signals in a PWM controller utilizing an embodiment of the system of these teachings.

In one embodiment, due to the dual edge nature of the PWM circuit, allowing the cycle center time to slide forward in time requires two ramp counters phase shifted by 180 degrees. (see FIG. 8) Referring to FIG. 8, the rising edge of HS is computed from ramp TB1 and the falling edge is computed from ramp TB2. This permits the final duty cycle value including adaptive dead-time offsets to introduce a substantially full half cycle offset. The substantially full half cycle offset cannot be obtained with one ramp as the falling edge will wrap to the next PWM cycle.

The above-described operations have the effect of moving the center of the PWM cycle forward in time, allowing the falling edge of LS and rising edge of HS to be pre-delayed by up to this same value. Tho and Tlo are additional user selectable (predetermined) offsets which permit adding safety margin to the dead-time ensuring shoot through current does not occur. The present teachings enable control of the on time of the switch node, thereby substantially obtaining a desired duty cycle. The predetermined delay time Tmax is utilized in order to obtain the desired result.

In order to better illustrate the present teachings, results of measurements for an exemplary embodiment, this teachings not being limited to only the exemplary embodiment, are presented hereinbelow.

Figure 9:
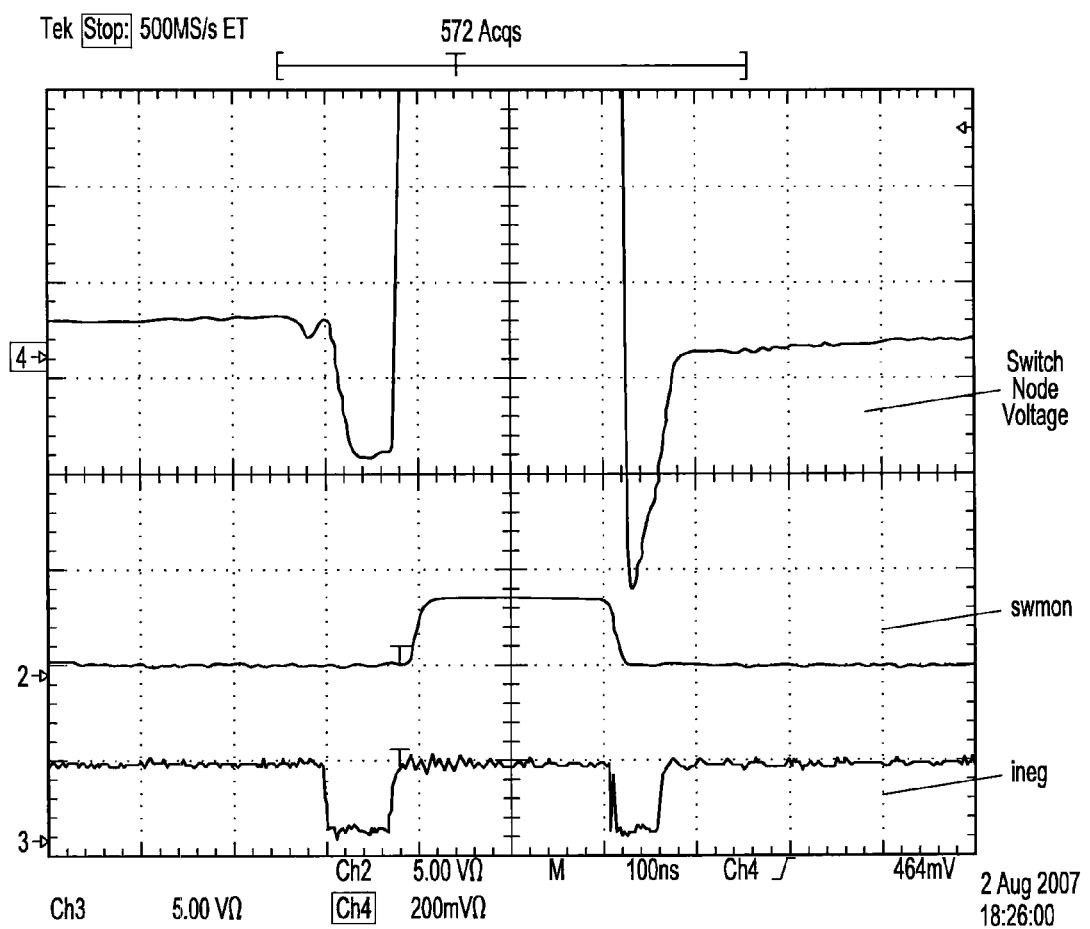
FIG. 9 is a graphical representation of measurements of conventional waveforms illustrating crossover times as noted by significant body diode conduction.

FIG. 9 depicts a graphical representation of signals from a conventional Buck regulator showing a fixed positive and negative dead-time delay. The body diode conduction time in the synchronous rectifier is indicated by the switch node voltage dipping below 0V.

Figure 10:
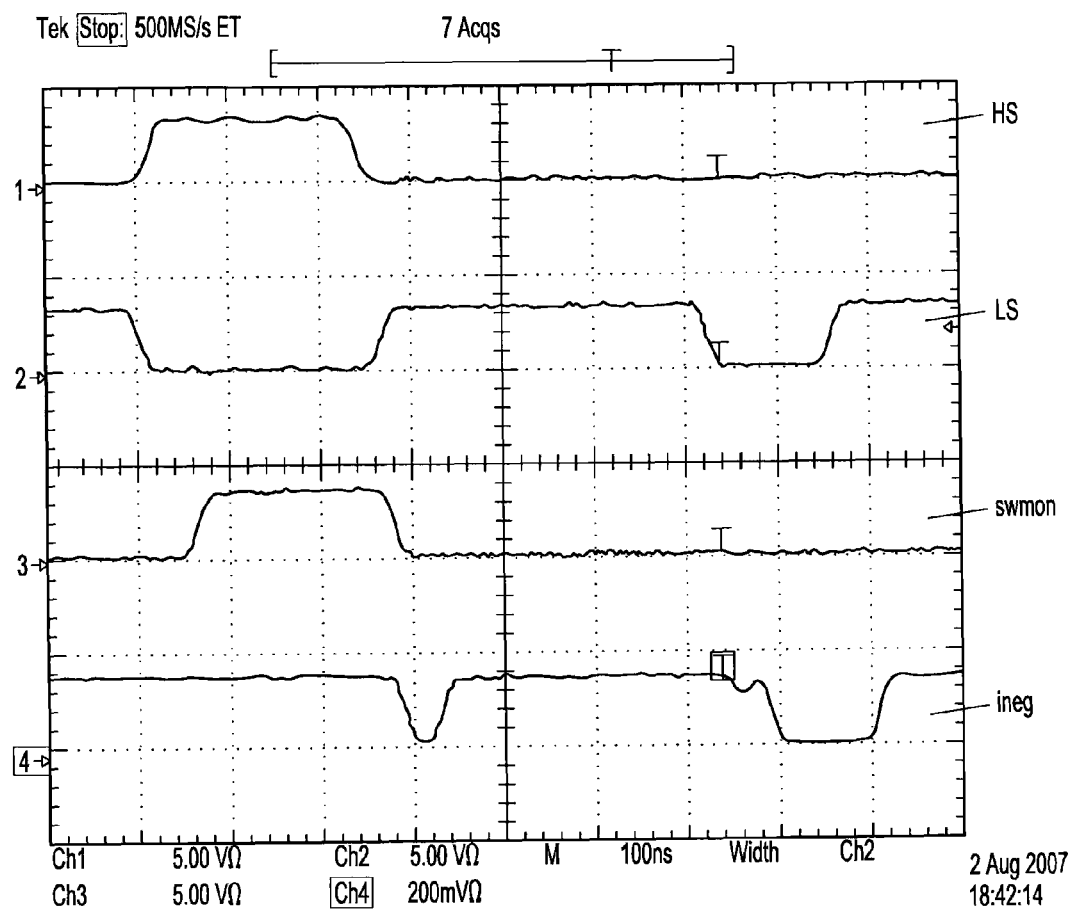
FIGS. 10-11 are graphical representations of measurements of waveforms using an embodiment of the system of these teachings.

FIG. 10 depicts a graphical representation of the switch command signals (HS, LS) from the PWM controller and the feedback signals used to measure the correct dead-time. "Ineg" is only observed during the special LS off time (the calibration time).

Figure 11:
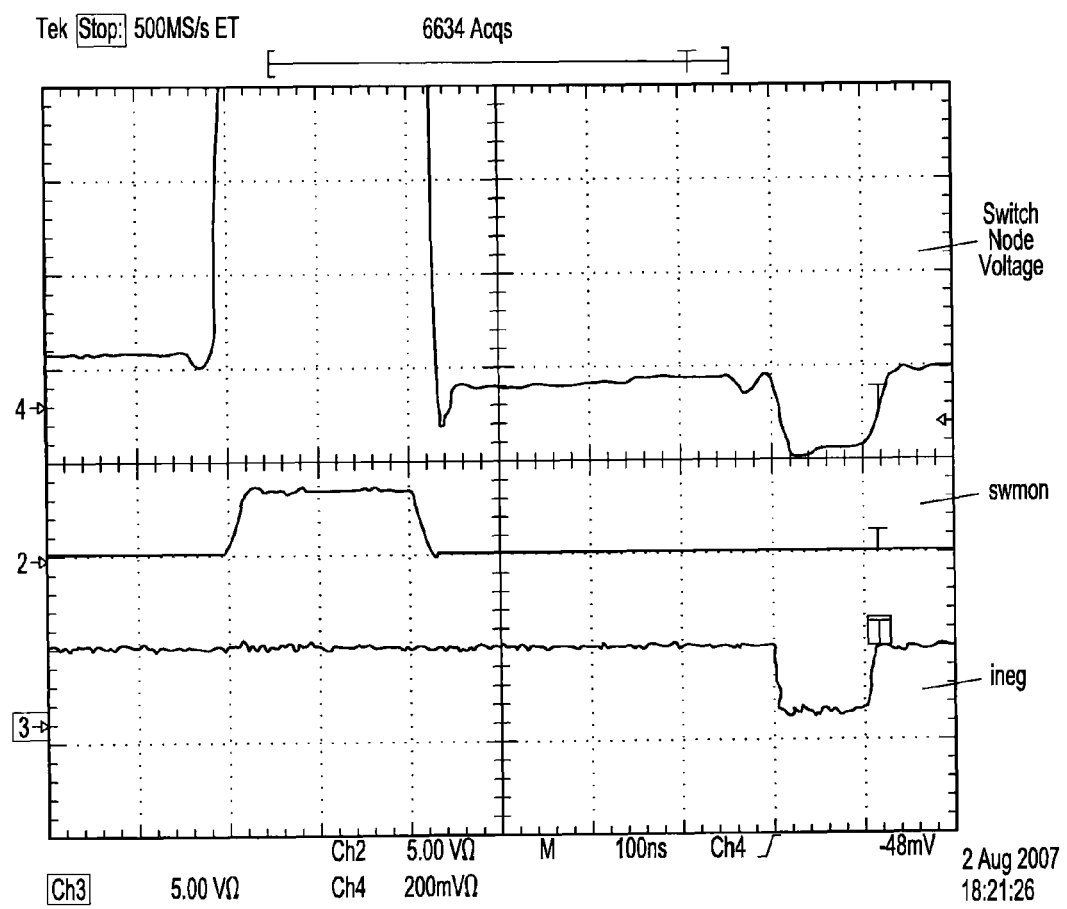

FIG. 11 is a graphical representation of the output of the two comparators (labeled 15 and 20 in FIG. 2), "swmon" and "ineg." "Swmon" is triggered at Vsupply/2 and "ineg" is triggered at −300 mV.

It should be noted that although these teachings have been illustrated above by means of a conventional buck regulator, this is not a limitation of these teachings and these teachings can be applied to other power regulators and power amplifiers.

Although these teachings have been described with respect to various embodiments, it should be realized these teachings are also capable of a wide variety of further and other embodiments within the spirit and scope of the appended claims.

What is claimed is:

1. A system, comprising:
a first switch connected to a voltage input and a switching node;
a second switch connected to the switching node and a reference potential;
a first circuit to generate first rising edges and first falling edges by comparing a voltage at the switching node to a first voltage reference, wherein the first voltage reference is between the reference potential and the voltage input;
a second circuit to generate second rising edges and second falling edges by comparing the switching node voltage to a second voltage reference, wherein the second voltage reference is less than the reference potential; and
a controller to:
calculate delay times based on the first rising edges, the first falling edges, the second rising edges and the second falling edges; and
generate drive signals for the first switch and the second switch based on a duty cycle and the delay times.

2. The system of claim 1, wherein the controller:
generates delayed first rise drive signals and delayed first fall drive signals for the first switch; and
generates delayed second rise drive signals and delayed second fall drive signals for the second switch.

3. The system of claim 2, wherein the controller calculates the delayed first rise drive signals based on the duty cycle, a maximum propagation delay, and a difference between the first rising edges and first rise drive signals.

4. The system of claim 2, wherein the controller calculates the delayed first fall drive signals based on the duty cycle, a maximum propagation delay, and a difference between the first falling edges and first fall drive signals.

5. The system of claim 2, wherein the controller calculates the delayed second rise drive signals based on the duty cycle, a maximum propagation delay, and a difference between the second rising edges and second rise drive signals.

6. The system of claim 2, wherein the controller calculates the delayed second rise drive signals based on the duty cycle, a sum of a maximum propagation delay and a first predetermined delay, and a difference between the second rising edges and second rise drive signals.

7. The system of claim 2, wherein the controller calculates the delayed second fall drive signals based on the duty cycle, a maximum propagation delay, and a difference between the second falling edges and second fall drive signals.

8. The system of claim 2, wherein the controller calculates the delayed second fall drive signals based on the duty cycle, a sum of a maximum propagation delay and a first predetermined delay, and a difference between the second falling edges and second fall drive signals.

9. The system of claim 2, wherein the delayed first rise drive signals, the delayed first fall drive signals, the delayed second rise drive signals and the delayed second fall drive signals are independently calculated.

10. The system of claim 2, wherein:
the controller generates calibration pulses that are output to the second switch at a rate that is less than a rate of the drive signals output to the second switch; and
during the calibration pulses, the controller calculates:
the delayed second rise drive signals based on the duty cycle, a maximum propagation delay, and a difference between the second rising edges and second rise drive signals; and
the delayed second fall drive signals based on the duty cycle, a maximum propagation delay, and the difference between the second falling edges and second fall drive signals.

11. The system of claim 10, wherein the controller only calculates the delayed second rise drive signals and the delayed second fall drive signals during the calibration pulses.

12. The system of claim 1, wherein the controller includes:
a pulse width modulated controller; and
a delay time controller.

13. A method comprising:
generating first rising edges and first falling edges by comparing a voltage at a switching node between a first switch and a second switch to a first reference,
wherein the first reference is between a reference potential and an input voltage, the first switch is connected to a voltage input and the switching node, and the second switch is connected to the switching node and the reference potential;
generating second rising edges and second falling edges by comparing the switching node voltage to a second reference, wherein the second reference is less than the reference potential;
calculating delay times based on the first rising edges, the first falling edges, the second rising edges and the second falling edges; and
generating drive signals for the first switch and the second switch based on a duty cycle and the delay times.

14. The method of claim 13, further comprising:
generating a delayed first rise drive signals and delayed first fall drive signals for the first switch; and
generating delayed second rise drive signals and delayed second fall drive signals for the second switch.

15. The method of claim 14, further comprising calculating the delayed first rise drive signals based on the duty cycle, a maximum propagation delay, and a difference between the first rising edges and first rise drive signals.

16. The method of claim 14, further comprising calculating the delayed first fall drive signals based on the duty cycle, a maximum propagation delay, and a difference between the first falling edges and first fall drive signals.

17. The method of claim 14, further comprising calculating the delayed second rise drive signals based on the duty cycle, a maximum propagation delay, and a difference between the second rising edges and second rise drive signals.

18. The method of claim 14, further comprising calculating the delayed second rise drive signals based on the duty cycle, a sum of a maximum propagation delay and a first predetermined delay, and a difference between the second rising edges and second rise drive signals.

19. The method of claim 14, further comprising calculating the delayed second fall drive signals based on the duty cycle, a maximum propagation delay, and a difference between the second falling edges and second fall drive signals.

20. The method of claim 14, further comprising calculating the delayed second fall drive signals based on the duty cycle, a sum of a maximum propagation delay and a first predetermined delay, and a difference between the second falling edges and second fall drive signals.

21. The method of claim 14, wherein the delayed first rise drive signals, the delayed first fall drive signals, the delayed second rise drive signals and the delayed second fall drive signals are independently calculated.

22. The method of claim 14, further comprising:
generating calibration pulses that are output to the second switch at a rate that is less than a rate of the drive signals output to the second switch; and
during the calibration pulses, calculating:
the delayed second rise drive signals based on the duty cycle, a maximum propagation delay, and a difference between the second rising edges and second rise drive signals; and
the delayed second fall drive signals based on the duty cycle, a maximum propagation delay, and the difference between the second falling edges and second fall drive signals.

23. The method of claim 22, further comprising calculating the delayed second rise drive signals and the delayed second fall drive signals only during the calibration pulses.

* * * * *

UNITED STATES PATENT AND TRADEMARK OFFICE
CERTIFICATE OF CORRECTION

PATENT NO.        : 8,164,320 B2                                     Page 1 of 1
APPLICATION NO.   : 13/012453
DATED             : April 24, 2012
INVENTOR(S)       : Paul W. Latham, II et al.

It is certified that error appears in the above-identified patent and that said Letters Patent is hereby corrected as shown below:

Col. 2, Line 20, delete "and" at end of line.

Col. 2, Line 23, insert --; and-- at end of sentence.

Col. 3, Line 65, delete "to 25" and insert --225--.

Col. 4, Line 9, delete "this" and insert --these--.

Col. 4, Line 21, delete "this" and insert --these--.

Col. 4, Line 33, delete "this" and insert --these--.

Col. 4, Line 47, delete "this" and insert --these--.

Col. 4, Line 55, delete "to" at end of line.

Col. 4, Line 60, delete "25" and insert --285--.

Col. 5, Line 41, delete "till" and insert --until--.

Col. 5, Line 45, delete "this" and insert --these--.

Col. 5, Line 55, delete "Tlphl" and insert --thphl--.

Col. 6, Line 13, delete "in" and insert --In--.

Col. 6, Line 15, delete "utilize" and insert --utilized--.

Col. 6, Line 49, delete "this" and insert --these--.

Signed and Sealed this
Twenty-ninth Day of January, 2013

David J. Kappos
*Director of the United States Patent and Trademark Office*